US005164569A

United States Patent [19]

Porra et al.

[11] Patent Number: 5,164,569

[45] Date of Patent: Nov. 17, 1992

[54] PLASMA-OPERATED CUTTING TORCH WITH CONTACT STARTING

[75] Inventors: Diego Porra, Vigardolo; Giuseppe Zigliotto, Longare, both of Italy

[73] Assignee: Trafimet SAS, Rome, Italy

[21] Appl. No.: 798,224

[22] Filed: Nov. 27, 1991

[30] Foreign Application Priority Data

Nov. 29, 1990 [IT] Italy ............................ 85651 A/90

[51] Int. Cl.$^5$ ............................................ B23K 9/00

[52] U.S. Cl. ......................... 219/121.57; 219/121.52; 219/124.01; 219/121.48; 219/121.5

[58] Field of Search ........... 219/121.5, 121.52, 121.48, 219/121.51, 121.54, 121.57, 75, 124.01

[56] References Cited

U.S. PATENT DOCUMENTS

| | | | |
|---|---|---|---|
| 3,004,189 | 10/1961 | Giannini | 219/75 |
| 3,082,314 | 3/1963 | Arata et al. | 219/75 |
| 3,131,288 | 4/1964 | Browning | 219/75 |
| 3,203,629 | 8/1965 | Goddard | 239/533.1 |
| 3,242,305 | 3/1966 | Kane et al. | 219/75 |
| 3,452,935 | 7/1969 | Herold | 239/533.1 |
| 3,641,308 | 2/1972 | Couch, Jr. et al. | 219/75 |
| 3,669,354 | 6/1972 | Helyer | 239/533.1 |
| 3,813,510 | 5/1974 | Hatch | 219/76 |
| 3,833,787 | 9/1974 | Couch, Jr. | 219/75 |
| 4,203,022 | 5/1980 | Couch, Jr. et al. | 219/124.02 |
| 4,370,539 | 1/1983 | Garlanov et al. | 219/121.5 |
| 4,463,245 | 7/1984 | McNeil | 219/121.48 |
| 4,567,346 | 1/1986 | Marhic | 219/121.52 |
| 4,625,094 | 11/1966 | Marhic et al. | 219/121.52 |
| 4,701,590 | 10/1987 | Hatch | 219/121.5 |
| 4,748,312 | 5/1988 | Hatch et al. | 219/75 |
| 4,777,343 | 10/1988 | Goodwin | 219/75 |
| 4,788,408 | 11/1988 | Wlodarczyk et al. | 219/121.57 |
| 4,791,268 | 12/1988 | Sanders | 219/121.57 |
| 4,896,016 | 1/1990 | Broberg et al. | 219/121.57 |
| 4,902,871 | 2/1990 | Sanders et al. | 219/75 |
| 4,959,520 | 9/1990 | Okada et al. | 219/121.57 |
| 5,083,005 | 1/1992 | Degrigny | 219/121.52 |

FOREIGN PATENT DOCUMENTS

| | | |
|---|---|---|
| 0157702 | 10/1985 | European Pat. Off. . |
| 0159256 | 10/1985 | European Pat. Off. . |
| 715875 | 10/1966 | Italy . |
| 54-128811 | 10/1979 | Japan . |
| 228803 | 10/1969 | U.S.S.R. . |

OTHER PUBLICATIONS

Italian Patent Application, Silvano Dallavalle et al., "Welding or Cutting Torch for Plasma with Nontransferred Arc", deposited Feb. 27 1986.

*Primary Examiner*—Mark H. Paschall
*Attorney, Agent, or Firm*—Watson, Cole, Grindle & Watson

[57] ABSTRACT

A plasma-operated cutting torch, has a diffusion chamber and a pressure chamber. A central shaft slidably supports an electrode in the diffusion chamber for contact with the nozzle. The central shaft has an annular collar slidable in the pressure chamber. Pressurized gas to be ionized flows into the pressure chamber and diffusion chamber which are always in open communication to the nozzle. The gas pressure against the collar forces the central shaft to move causing separation of the electrode away from the nozzle.

9 Claims, 2 Drawing Sheets

62
63
60
61
12
40
43
100
16
42
41
6
52
54
51
50
55
44
53
7
18
5
28
3
13
22
14
4
23
45
2
9
90
24
8
10
65
11

PLASMA-OPERATED CUTTING TORCH WITH CONTACT STARTING

BACKGROUND OF THE INVENTION

The invention concerns a plasma-operated cutting torch with contact starting. It is known that plasma operated torches are used for cutting metals. Typically a plasma fluid such as a gas is ionized by an electromagnetic field. Current flow in the form of an electric arc is then initiated. The electric arc is caused to strike between the electrode and the nozzle of the torch by means of a contact starting by high-frequency across a gap. The resulting flow of plasma streaming from the torch allows the performance of the cutting operation.

Contact starting torches are known wherein the electric arc is initiated separating the electrode from the nozzle by exploiting the force exerted by the gas to be ionized. This gas is pressurized and acts against a surface coupled to the electrode in the plasma chamber. Another known torch has the chamber to be pressurized separated from the plasma chamber. In such arrangements, the plasma chamber is blocked prior to contact starting and no gas flows. Thus, transfer of the arc to the work may be delayed or inhibited upon spark ignition. Also, debris may build up in the plasma chamber.

Known torches have complicated construction. Because of this complexity, the mechanism of the electrode is difficult to move.

Complex construction also entails another disadvantage, namely, that repeated use causes relative movement between component parts which, in the long run, prevents the torch from functioning consistently and reliably.

SUMMARY OF THE INVENTION

The present invention eliminates the described inconveniences and shortcomings of the prior art. In particular, the invention is directed to a torch which is simpler in its construction than known devices. In accordance with the invention, the torch maintains unaltered and consistent operational characteristics during its entire life span. The foregoing advantages are achieved by a plasma-operated cutting torch which, in accordance with the invention, comprises a central shaft presenting an electrode at its front end and a sleeve within which the central shaft slides. The sleeve is connected at its rear end with a hollow insulating body. An insulating annular flange is arranged at the rear of the insulating body, and a spring exerts a force on the central shaft to urge it at the rear end of the central shaft within a seat in the insulating annular flange. A nozzle arranged outside the electrode and co-axial with it is aligned with the front part of the central sleeve and an insulating annular diffuser is coaxially interposed therebetween forming a diffusing chamber between the electrode and the nozzle. An insulated outer bushing is secured coaxially to the outer part of the main body of the torch wherein the nozzle is secured. A cooling chamber is located between the outer surface of the nozzle and the surface of the outer insulated bushing facing the nozzle. The central shaft has an annular collar near its rear end with one or more flat surfaces being orthogonal to the longitudinal axis of the shaft. The flat surface slides within a pressure chamber formed between the rear end of the sleeve and the front end of the insulating annular flange within the insulating body. Gas under pressure to be ionized is conveyed into the chamber, wherein the pressure of said gas presses against said flat surfaces of the annular collar and thereby drives the central shaft rearwardly. As a consequence, the electrode is separated from the nozzle thereby initiating a spark when a current is applied through the electrode nozzle.

BRIEF DESCRIPTION OF THE DRAWINGS

The applicability of the present invention will become apparent from the detailed description given hereinafter. However, it should be understood that the detailed description and the specific example, while indicating a preferred embodiment of the invention, are given by way of illustration only, since various changes and modifications within the spirit and scope of the invention will become apparent to those skilled in the art from this detailed description and from the drawings, wherein.

DESCRIPTION OF THE PREFERRED EMBODIMENT

Figure 1:
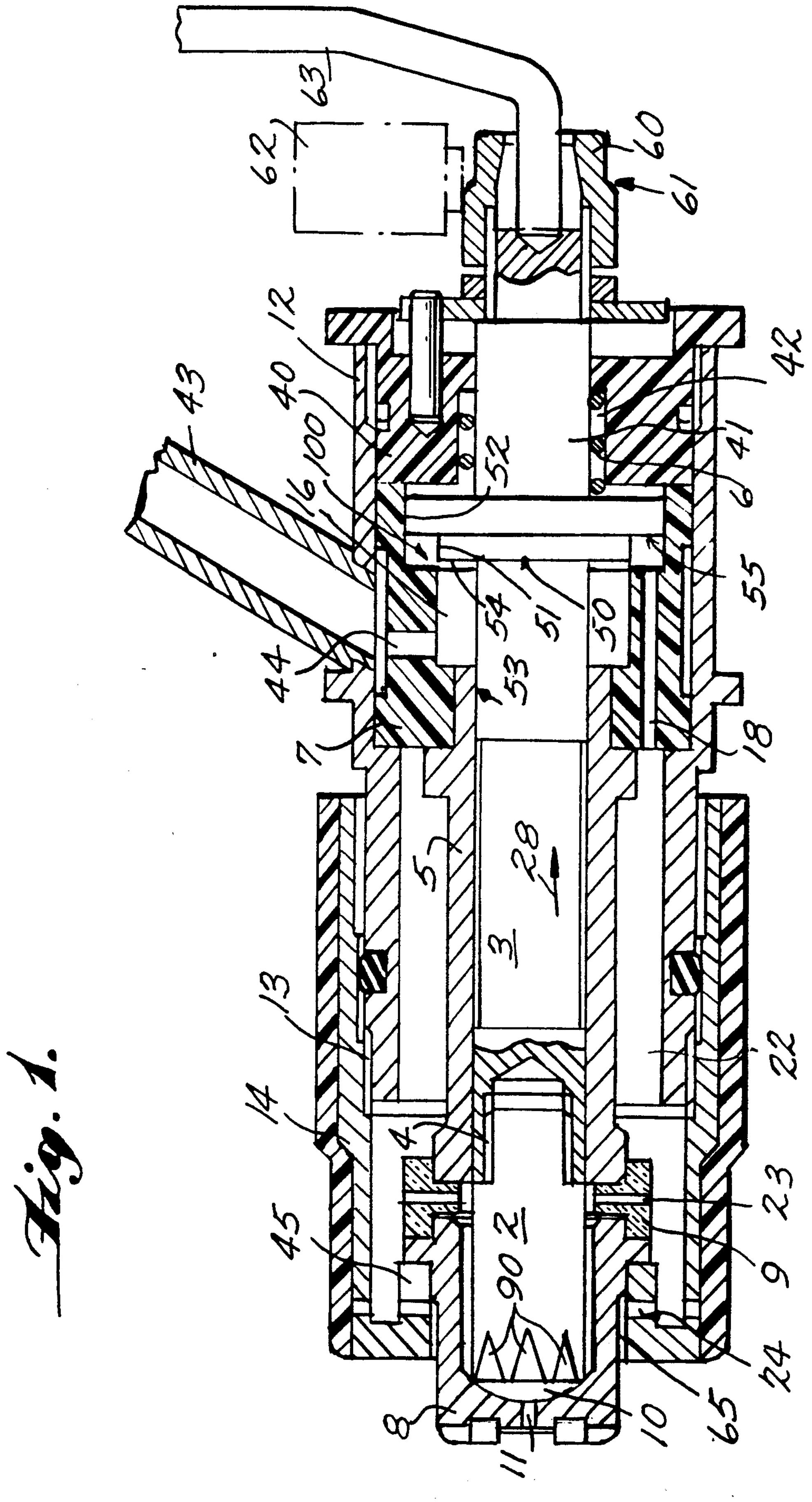
FIG. 1 represents the longitudinal cross-section of the torch according to the invention prior to plasma ignition.
Figure 2:
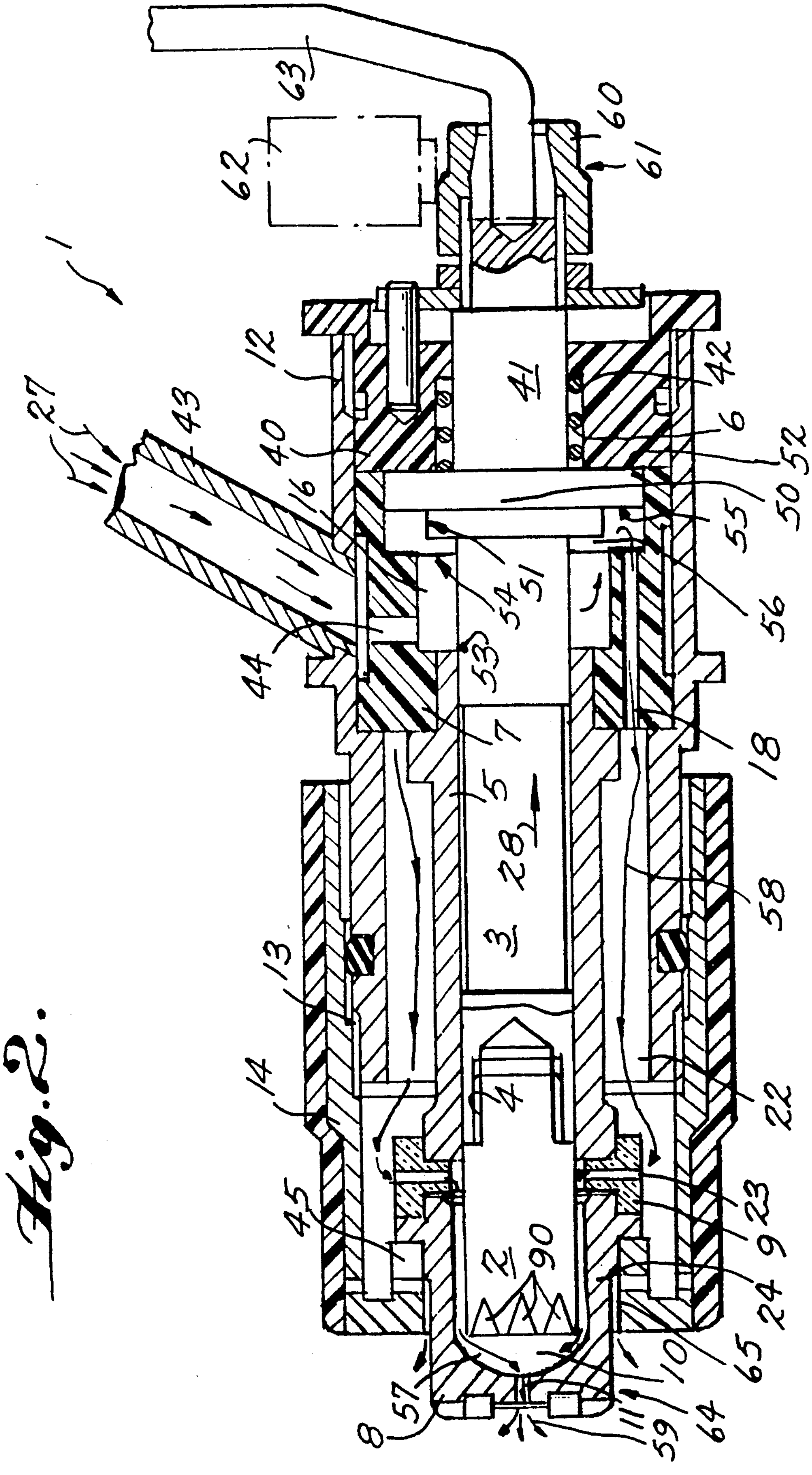
FIG. 2 shows the torch of FIG. 1 with the electrode separated from the nozzle, and in an operative condition with a jet of plasma flowing out of the nozzle.

As can be observed in FIG. 1, the torch 1 according to the invention comprises an electrode 2 attached to the front end of a central shaft 3 by a thread 4. It is obvious, however, that this connection can also be achieved by other known mechanical means, rather than by a thread.

The central shaft 3 is mounted co-axially within a sleeve 5 and an insulating body 7. The sleeve 5 and the insulating body 7 also being co-axial and aligned with each other. A nozzle 8 is connected through the interposition of an insulating annular diffuser 9, acting as an element for the connection with the front end of the central sleeve 5.

It will be specifically observed that the nozzle 8 is arranged co-axially with the exterior of electrode 2 and that between the two of them they form a diffusion chamber 10, which, through an opening 11 in nozzle 8, diffuses toward the exterior the gas, after it has been ionized.

A main body 12 supports the insulating body 7 and the sleeve 5 coaxially therein. An outer bushing 14 is connected to the exterior of the front end of the main body 12 coaxially through a thread 13. An insulating annular flange 40 is coupled within the rear end of the same main body 12. Said flange is in turn coupled with the exterior of the rear end 41 of the central shaft 3. The insulating annular flange 40 has a cylindrical seat 42 for receiving a spring 6 which engages the end 41 of the central shaft 3, which pushes the electrode 2 into contact with the nozzle 8.

A pressure chamber 16 is located within the torch near the rear end and is defined by the central shaft 3, the insulating body 7, the rear end of the central sleeve 5 and the insulating annular flange 40. The pressure chamber 16 is supplied with gas to be ionized through an inlet duct 43 and an interconnected radial opening 44 in the insulating body 7. The chamber 16 communicates through a plurality of channels 18 arranged in the longitudinal direction in the insulating body 7 with a collecting chamber 22 formed in the space between the sleeve 5 and the main body 12. The terminal end of the collecting chamber 22 communicates through the radial ducts 23, arranged in the annular diffuser 9 with the diffusing chamber 10 and, through outer ducts 24, arranged in the outer insulated bushing 14, with the outer cooling chamber 65 positioned between the nozzle 8 and the outer insulated bushing 14.

It can be observed that the central shaft 3 has in correspondence with the pressure chamber 16 and in the interior of the same, an annular collar 50 having two cylindrical surfaces 51 and 52, formed with corresponding diameters which are larger than the diameter 53 of the central shaft 3. The annular collar 50 has annular surfaces 54 and 55 respectively, which are orthogonal to the longitudinal axis of the central shaft 3. Pressurized gas to be ionized is let into the pressure chamber 16 through the duct 43 and the opening 44. The gas exerts pressure against the annular surfaces 54 and 55 causing the collar 50 to move rearwardly in the chamber 16. A shaped metal ring 60 is attached to the rear end of the central shaft 3. The metal ring 60 has a profiled surface which contacts electrically coupled to a micro-switch 62. An electric power source (not shown) supplies electric power to the cable 63. In the position shown, the shaped metal ring 60 engages the micro-switch 62 so that power is supplied to the cable 63.

In order for the torch to operate, it is important for the outer insulated bushing 14 to be tightened around the main body 12 so that the ledge 45 of the bushing 14 contacts against the nozzle 8 and forces the central shaft 3 to move backward so as to assure a circular opening 100 between the annular surface 54 and the inner longitudinal wall of the insulating body 7, both when the torch is at rest and when the torch is on.

It should be pointed out that the circular opening 100, the chamber 16 is always open as it communicates on the one had with the gas duct 43 through the opening 44 and on the other hand with the atmosphere first through the longitudinal openings 18, the collecting chamber 22, and the diffusion chamber 10 via radial ducts 23, communicating with the external atmosphere through the cuts 90 in the electrode 2 and the orifice 11. In this way, there is little or no lag between the time the as flow is initiated and gas enters the diffusion chamber 10. This provides more reliable starting and maintains gas flow to avoid build-up of debris in the diffusion chamber 10. Also, the cuts 90 increase electrode surface ares and enhance cooling thereof. The pressure chamber 16 is also in open communication to the atmosphere via the collecting chamber 22, outer ducts 24 and cooling chamber 65.

As can be observed in FIG. 1, the shaped metal ring 60 engages with its profile 61 the micro-switch 62 and thereby closes the contact which sets the conditions for the electric panel (not shown) to supply power to the cable 63.

Should the bushing 14 not be sufficiently tightened, the micro-switch 62 is not engaged by the metal ring 60 because the shaft 3 to which the metal ring 60 is connected moves forward being pushed by the spring 6 and, therefore, no signal for the activation of the power supply to cable 63 can be given. This is a safety feature, which prevents the accidental sparking of the torch, should the bushing 14 not be present. The torch operates when gas 27 begins to stream through the duct 43 and the opening 44 into the pressure chamber 16. At the same time, the closed electric circuit allows current to pass between the electrode 2 and the nozzle 8. The electrode 2 acts as a cathode and the nozzle 8 acts as an anode. The pressure of the gas 27 acts on the annular surface 54 of the annular collar 50 of the central shaft 3 and forces it to move backward, in the direction indicated by arrow 28, when the force exerted by said pressure on the surface 54 exceeds the elastic reaction of the spring 6.

When the central shaft 3 begins to move backward, the electric arc between the electrode 2 and the nozzle 8 strikes while the gas flows through the diffusion chamber 10 from the pressure chamber 16 through the longitudinal openings 18, the collecting chamber 22 and the radial openings 23. From here, a portion of the gas streams from the opening 11 in the form of a plasma jet 59 and a portion of the gas streams from the other ducts 24 to the cooling chamber 65, so that by skimming over the outer surface 64 of nozzle 8, it cools it. As long as the gas stream 27 entering the pressure chamber 16 maintains the pressure conditions on the annular collar 50, there is a constant flow of plasma 59 through the opening 11, and this allows the cutting operation to continue.

When the flow of gas 27 is interrupted, there is no longer any pressure on collar 50, counter-balancing the elastic stress of spring 6. The spring 6 extends thereby pushing the central shaft 3 and the electrode connected with to rest against the nozzle 8. The arc is extinguished and the torch resumes the initial conditions represented in FIG. 1.

On the basis of what has been described, it can be observed that the described torch according to the invention is constructed of a reduced number of parts as compared with known torches. As a consequence, there is a smaller number of parts with relative movements and, therefore, a lesser degree of wear and tear. As a result, the performance of the torch is generally consistent and is not altered during its life-span.

During the construction phase of the torch according to the invention, changes and modifications may be made concerning the dimensions, or the shape, or the systems for connecting together the different component parts. It will also be possible to use for the elastic displacement of the central shaft 3 elastic elements other than springs. It is, however, understood that said changes and modifications will not exceed the scope and spirit of the present invention.

What is claimed:

1. A plasma-operated cutting torch comprising:

a torch body having a front and rear end;

an elongated thermally conductive central shaft slidably located in the torch body having a rear end and a front end and an electrode carried at its front end;

a thermally conductive sleeve within which the central shaft slides in contact, said sleeve being connected at its rear end with a hollow electrically insulating body in the rear of the torch body;

an electrically insulating annular flange forming a pressure chamber within the insulating body and having a seat therein located adjacent the electrically insulating body;

a spring exerting a force on the central shaft and arranged at the rear end of the central shaft and located within the seat in the insulating annular flange;

a nozzle arranged outside the electrode and co-axial with it being in narrowly spaced axial relation with the sleeve and an electrically insulating annular diffuser interposed in the space for connecting the nozzle and the sleeve;

a bushing applied on the outer part of the main body of the torch and co-axial with the conductive sleeve forming a collecting chamber thereabout and having an axial opening wherein the nozzle is secured;

a diffusing chamber between the electrode and the nozzle;

a cooling chamber between the outer surface of the nozzle and the surface of the outer insulated bushing facing the nozzle for cooling the nozzle, the central shaft carries near its rear end and an annular collar with one or more flat surfaces being orthogonal to the longitudinal axis of the central shaft which slides within the pressure chamber within the insulating body, said chamber being formed between a rear end of the sleeve and a front end of the insulating annular flange, gas under pressure to be ionized being sent into said chamber, wherein the pressure of said gas presses against said flat surfaces of the annular collar for driving the central shaft and electrode carried at the front end thereof rearwardly against the spring force away from the nozzle to thereby initiate spark starting of the gas, while at least a part of the gas flows from the pressure chamber into the diffusing chamber and exits from the orifice.

2. A torch according to claim 1, wherein the annular collar of the shaft has a cylindrical shape of two differing diameters, the surfaces on which the gas exerts its pressure being annular radial planes joining the diameters of the annular collar to the central shaft.

3. A torch according to claim 1, wherein the pressure chamber communicates with the diffusing chamber through a collecting chamber formed between the sleeve and the main body of the torch, wherein at least one duct formed in the insulating body permits the communication between said collecting chamber and the pressure chamber while at least one duct arranged in the insulating annular diffuser permits the communication between the collecting chamber and the diffusing chamber.

4. A torch according to claim 3, wherein radial ducts formed in the outer insulated bushing permit the communication between the collecting chamber and the cooling chamber where at least a part of the gas coming from the pressure chamber passes.

5. A torch according to claim 1, wherein the central shaft presents in its back a shaped metal ring which is connected with said central shaft which, only when the torch is fully assembled, contacts against a micro-switch which supplies the signal for the sparking of the torch.

6. A torch according to claim 1, wherein the pressure chamber is in open communication with the diffusion chamber at all times.

7. A torch according to claim 1, wherein the electrode has radial slots therein forming an open channel in the diffusion chamber with the nozzle outlet.

8. A plasma-operated cutting torch comprising: a hollow torch body having forward and rearward ends;

an electrically insulating sleeve located in the rearward end of the torch body and having a central through opening and a recess in its rearward end;

a thermally conductive elongated sleeve secured to the forward end of the insulating sleeve and having a central through opening coaxially aligned therewith;

an electrically insulating bushing being secured to the forward end of the torch body and having a central through opening coaxially aligned with the central through opening in the insulating and conductive sleeves and forming a cooling chamber about said conductive sleeve;

an electrically insulating flange removably secured in the torch body in abutment with the rearward end of the insulating sleeve, said flange and sleeve forming a pressure chamber and seat therebetween;

a thermally and electrically conductive elongated central shaft slidably secured in the through openings of the sleeves and being in contact with a portion of the conductive sleeve and presenting a surface for transferring heat to said sleeve, said shaft having a collar portion formed near the rearward end, and being axially slidable in the pressure chamber;

a spring located in the seat between the insulating sleeve and the flange and engaging the collar for biasing the collar forwardly in the pressure chamber when said spring is relaxed;

an electrode removably secured to the forward end of the central shaft, said electrode having channel portions formed in outer surfaces thereof;

an electrically conductive nozzle removably secured in the opening within the insulating bushing and being in closely spaced axial relation with the conductive sleeve, said nozzle having an outlet opening and a central recess for receiving the electrode in electrically contacting relation therein when the spring is relaxed;

an electrically insulating annular diffuser having a central through opening and radial inlets and being located between the conductive sleeve and the nozzle;

said torch having a diffusion chamber defined between the recess of the nozzle and the opening in the diffuser and the forward end of the conductive sleeve; a pressure chamber defined between the recess in the insulating sleeve and the collar slidable therein; and a collecting chamber between the pressure chamber and the diffusion chamber being in flow communication with the cooling chamber external of the nozzle, said torch being operable to initiate contact starting of an ionizable gas conducted to said diffusion chamber via said pressure chamber and said pressure chamber and diffusion chamber being at all times in open flow communication with the nozzle opening via said channel portions in the electrode.

9. A plasma-operated cutting torch comprising:

a hollow torch body having forward and rearward ends;

an electrically insulating sleeve located in the rearward end of the torch body and having a central through opening and a recess in its rearward end;

a thermally conductive elongated sleeve secured to the forward end of the insulating sleeve and having a central through opening coaxially aligned therewith;

an electrically insulating bushing being secured to the forward end of the torch body and having a central through opening coaxially aligned with the central through opening in the insulating and conductive sleeves and forming a cooling chamber about said conductive sleeve;

an electrically insulating flange removable secured in the torch body in abutment with the rearward end of the insulating sleeve, said flange and sleeve forming a pressure chamber and seat therebetween;

a thermally and electrically conductive elongated central shaft slidably secured in the through openings of the sleeves and being in thermal contact with the conductive sleeve for transferring heat to said sleeve, said shaft having a collar portion formed near the rearward end, and being axially slidable in the pressure chamber;

a spring located in the seat between the insulating sleeve and the flange and engaging the collar for biasing the collar forwardly in the pressure chamber when said spring is relaxed;

an electrode removably secured to the forward end of the central shaft;

an electrically conductive nozzle removably secured in the opening within the insulating bushing and being in closely spaced axial relation with the conductive sleeve, said nozzle having an outlet opening and a central recess for receiving the electrode in electrically contacting relation therein when the spring is relaxed;

an electrically insulating annular diffuser having a central through opening and radial inlets and being located between the conductive sleeve and the nozzle;

said torch having a diffusion chamber defined between the recess of the nozzle and the opening in the diffuser and the forward end of the conductive sleeve; a pressure chamber defined between the recess in the insulating sleeve and the collar slidable therein; and a collecting chamber between the pressure chamber and the diffusion chamber being in flow communication with the cooling chamber external of the nozzle through the opening in the insulated bushing, said torch being operable to initiate contact starting of an ionizable gas conducted to said diffusion chamber via said pressure chamber, and a portion of said gas flowing through the collecting chamber for receiving heat from the conductive sleeve to cool the central shaft and the electrode.

* * * * *

UNITED STATES PATENT AND TRADEMARK OFFICE
CERTIFICATE OF CORRECTION

PATENT NO. : 5,164,569

DATED : November 17, 1992

INVENTOR(S) : Diego PORRA et al.

It is certified that error appears in the above-identified patent and that said Letters Patent is hereby corrected as shown below:

On the title page: Item

[73] Assignee: Trafimet SAS, Ponte Di Castegnero (Vicenza), Italy

Signed and Sealed this

Third Day of May, 1994

Attest:

Bruce Lehman

BRUCE LEHMAN

*Attesting Officer* *Commissioner of Patents and Trademarks*